US011314666B2

(12) United States Patent
Aharony et al.

(10) Patent No.: US 11,314,666 B2
(45) Date of Patent: Apr. 26, 2022

(54) SYSTEMS AND METHODS FOR OPTIMIZING CLOCK DISTRIBUTION IN NVME STORAGE ENCLOSURES

(71) Applicant: Dell Products, LP, Round Rock, TX (US)

(72) Inventors: Dor Aharony, Newton, MA (US); Stephen Strickland, Foxborough, MA (US); Gary W. Smith, Cumberland, RI (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/025,691

(22) Filed: Sep. 18, 2020

(65) Prior Publication Data
US 2022/0092003 A1 Mar. 24, 2022

(51) Int. Cl.
| G06F 13/16 | (2006.01) |
| G06F 13/42 | (2006.01) |
| G06F 1/10 | (2006.01) |
| G06F 1/20 | (2006.01) |
| G06F 1/18 | (2006.01) |
| G06F 1/16 | (2006.01) |
| G06F 1/04 | (2006.01) |

(52) U.S. Cl.
CPC ............ *G06F 13/1668* (2013.01); *G06F 1/04* (2013.01); *G06F 1/10* (2013.01); *G06F 1/1658* (2013.01); *G06F 1/187* (2013.01); *G06F 1/206* (2013.01); *G06F 13/4291* (2013.01); *G06F 2213/0026* (2013.01)

(58) Field of Classification Search
CPC ........ G06F 13/1668; G06F 1/206; G06F 1/10; G06F 31/4291; G06F 1/1658; G06F 1/187; G06F 1/04; G06F 2213/0026
See application file for complete search history.

(56) References Cited

U.S. PATENT DOCUMENTS

| 2017/0300445 | A1* | 10/2017 | McKnight | ........... G06F 13/4068 |
| 2020/0133355 | A1* | 4/2020 | Bassman | ................... G06F 1/24 |
| 2021/0026428 | A1* | 1/2021 | Olarig | ..................... G06F 1/189 |
| 2021/0182110 | A1* | 6/2021 | Ye | ........................... G06F 1/206 |

* cited by examiner

*Primary Examiner* — Glenn A. Auve
(74) *Attorney, Agent, or Firm* — Prol Intellectual Property Law, PLLC; H. Kenneth Prol (57) ABSTRACT

A non-volatile memory express (NVMe) based storage system may include a processor; an input/output (I/O) port operatively coupled to a data network; a drive interface board (DIB), including: a PCIe switch communicatively coupled to the processor to receive signals from the processor to a plurality of NVMe storage devices; and a source clock communicatively coupled to the PCIe switch; a connector communicatively coupling the DIB to relay clock signals to a plurality of NVMe drives at a drive mid-plane baseboard; the drive mid-plane baseboard communicatively coupled to the source clock, the drive mid-plane baseboard including: a clock distribution module to receive a source clock signal from the source clock, the clock distribution modules placed at the drive baseboard to distribute the clock signals to the plurality of NVMe storage devices.

20 Claims, 6 Drawing Sheets

SYSTEMS AND METHODS FOR OPTIMIZING CLOCK DISTRIBUTION IN NVME STORAGE ENCLOSURES

FIELD OF THE DISCLOSURE

The present disclosure generally relates to NVME-based data storage devices. The present disclosure more specifically relates to a distributed clock configured within a NVMe-based data storage device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a memory or other data storage device

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a data storage system that includes a distributed clock topology. A clock, whether it is a source clock or dependent clock, is an electronic oscillator that produces a signal used in synchronizing a circuits operation and, in the examples described herein, manipulation of data at a data storage device such as a NVMe data storage device. This distributed clock topology described herein may be used in current servers being developed that implement peripheral component interconnect express (PCIe) storage media in certain server systems for example. For example, in those server systems that implement non-volatile memory express (NVMe) data storage devices, a PCIe switch may be used to increase the number of signals that can be processed and sent to the NVMe data storage devices. However, this results in an increased number of signals that connect the processor of the server and PCIe switches to the drives over a given information handling system. Because the processors and PCIe switches do not reside on the same PCB board or same location as one or more drive units of a data storage information handling system. The increased number of signals, including necessary clocking signals, translates to an increase in connectors sizes and pin count between the PCB boards. These connectors may include as many as 145 pins, in some embodiments, to help transmit the signals from the PCIe switch and processor to the NVMe drives of the server. Regardless of the number of pins, the number of clock pins within the connectors may be increased with every additional NVMe drive present. This may mean, in some embodiments, that for every NVMe drive, the connector will include 4 signal pins per drive: 1 ground pin, 1 positive voltage signal pin, 1 negative voltage signal pin, and 1 ground pin. If multiple clock signals are sent together in one connector the number of pins would be, 6 for each drive: 2 positive voltage signal pins, 2 negative voltage signal pins, and 2 ground pins. This increase of connector sizes, however, creates an additional challenge that includes, among others, efficiently providing cooling to the drives and other components of the server. Because of the pin count of the connectors, these connectors increase in physical size such that airflow is blocked at the drive baseboard, midplane, or other printed circuit board. For example, a drive mid-plane baseboard may be a vertical printed circuit board and may include some vents or slats cut through to allow airflow throughout the server system. The drive mid-plane baseboard may be disposed vertically to allow an array of NVMe drives to be operatively coupled to it for power and data connections. These large connectors to the drive midplane baseboard may block this airflow at vents or slats thereby decreasing the ability of a cooling system to pass air throughout the server system.

The present specification describes a non-volatile memory express (NVMe)-based storage system that includes a processor; a drive interface board, including: a PCIe switch communicatively coupled to the processor to receive signals from the processor to be routed to a plurality of NVMe storage devices; and a source clock communicatively coupled to the PCIe switch, the processor and the NVMe drives. The NVMe-based storage device also includes a connector communicatively coupled to the source clock to relay signals to a plurality of NVMe drives at a drive mid-plane baseboard wherein the drive mid-plane baseboard is communicatively coupled to the source clock. The drive midplane may include the drive mid-plane baseboard for connecting signals via one or more connectors to a plurality of NVMe drives. The drive mid-plane baseboard may include a clock distribution board; a plurality of clock distribution modules to receive a control clock signal from the source clock, the clock distribution modules placed at the drive mid-plane baseboard. The drive mid-plane may include the drive mid-plane baseboard and any interim connecting board or other connector that may be used to link the link controller card (LCC) including I/O ports, processor, and PCIe switch to the NVMe storage drives. These interim connectors, board, or cabling may include routing for signals, power, and clocking through or around cooling systems such as a bank of fans as described in an embodiment of the present disclosure. For example, a cooling system, in an embodiment, may also be included within the NVMe-based storage system that includes a plurality of fans placed between the drive interface board having one or more PCIe switch circuits and the drive mid-plane baseboard. The connector communicatively couples the source clock to the plurality of clock distribution modules on the clock distribution board via a lead passing between the plurality of fans. Thus, each NVMe drive will not require direct clock signaling in the connector from the source clock as well as data connections from the PCIe switch as in previous systems.

Placement of the clock distribution modules, in some embodiments, being placed close to the NVMe storage device end points reduces pins and connector size on the drive baseboard, the system mid-plane, and any other connecting boards between them by reducing the number of signal lines to each of the plurality of NVMe drives. This reduces the pin count on any of these different boards and any connectors associated therewith. This allows for a balanced and increased airflow across the NVMe storage devices and other components of the information handling system (e.g., server). Still further, traditional right-angle backplane connectors, though accommodating a high density of connections, may be avoided in some embodiments because required pin density may be reduced in some embodiments. In one embodiment thereby, the airflow throughout the information handling system may be improved with use of edge card connectors or other low-profile connectors in some embodiments.

During operation of the clock distribution modules, the clock distribution modules, in various embodiments, act as the control clock (aka: source clock or common clock) for the other dependent clocks located on a drive interface board, as the control clock for the drives themselves or dependent clock distribution modules on the drive mid-plane baseboard, or as the control clock for dependent clocks at other locations in the data storage information handling system. In an alternative embodiment, other clock generators within the information handling system may serve as a control clock for the clock distribution modules with the clock distribution modules linked to the individual NVMe storage devices and control the signaling of those NVMe storage devices across to and at the mid-plane.

Figure 1:
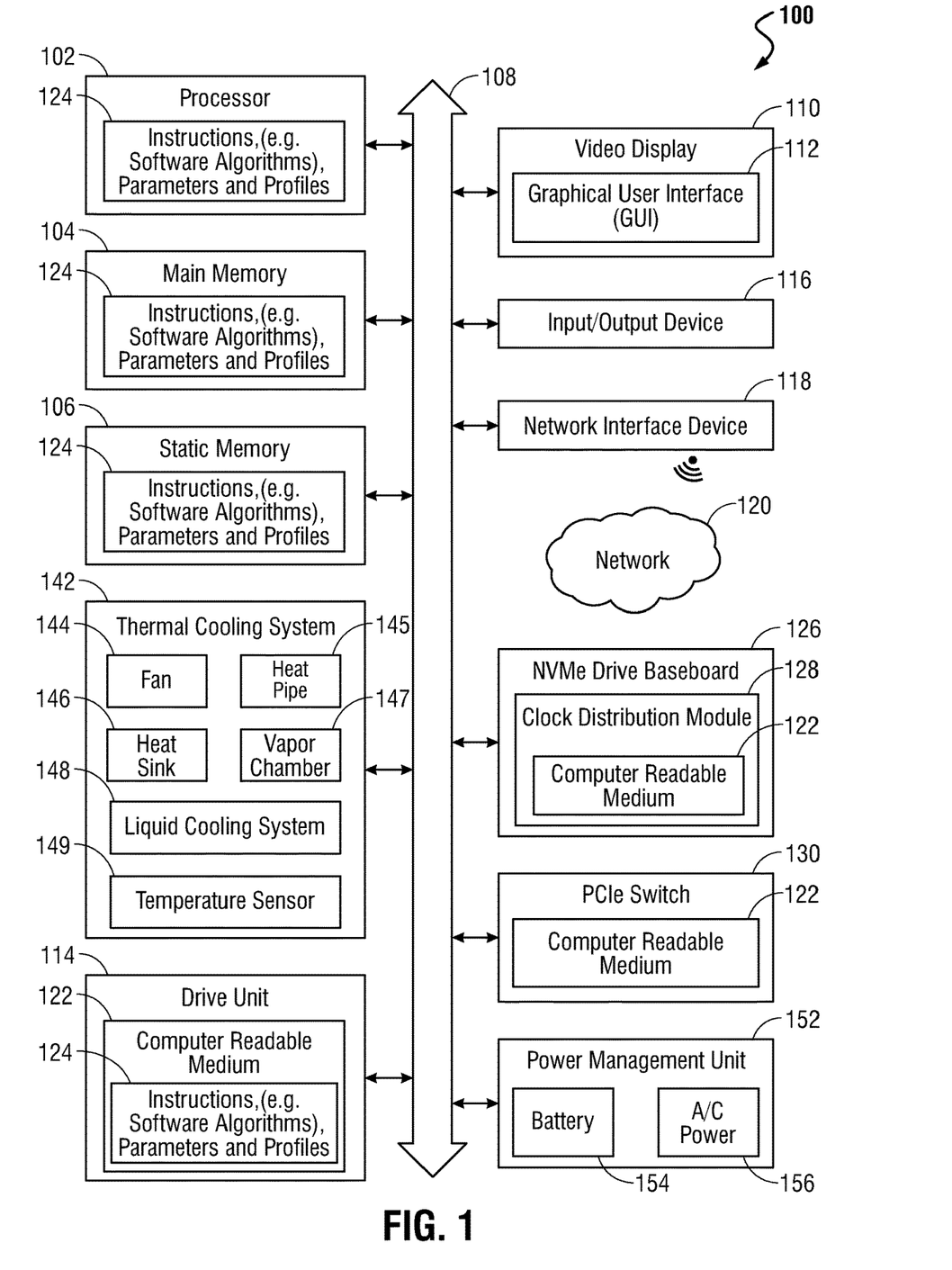
FIG. 1 is a block diagram illustrating an information handling system according to an embodiment of the present disclosure.

Turning now to the figures, FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions. Thus, although the present specification describes that the clock distribution module is used in a server-type information handling system 100 and, in a specific embodiment, an NVMe-based server, the present specification contemplates that the principles described herein may be equally applied to other types of information handling systems 100.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on other remote servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. In a specific embodiment, the processor 102 may be placed on a storage access module (SAM) and be electrically and mechanically coupled to a drive interface board (DIB) within the information handling system 100. Together, the SAM and DIB may form a link controller card (LCC) that allows for easy swapping of these components as well as other components formed on the information handling system. The LCC assembly may then be operatively coupled through to the bank of NVMe drives 114 via an NVMe drive baseboard 126 also referred to as a drive mid-plane baseboard. Although the SAM is described herein as including a processor 102, the present specification contemplates that a signal repeater, receiving signals from a remote processor. In other embodiments, the LCC may contain a signal repeater only that is communicatively coupled to a PCIe switch 130 and a processor 102 located remotely from the information handling system 100. In this embodiment, the PCIe switch 130 and processor 102 may receive clock signals from a remote location to drive the clock distribution module 128 for the NVMe drives.

Any of the processing resources within the information handling system 100 may operate to execute code that is either firmware or software code. Moreover, the information handling system 100 can include memory such as main memory 104, static memory 106, computer readable medium 122 storing instructions 124 of the clock distribution module 128, and drive unit 114 (volatile (e.g. random-access memory, etc.), nonvolatile (read-only memory, flash memory etc.) or any combination thereof). Among these drive units 114, the information handling system 100 may also include a series of NVMe drives. The NVMe drives may be any type of drive, such as solid-state drives (SSDs), that NVM Express specifications are used by a PCIe switch 130 to access the NVMe drives via PCIe bus connection such as on bus 108. The information handling system 100 can also include one or more buses 108 operable to transmit communications between the various hardware components such as any combination of various input and output (I/O) devices.

The information handling system 100 may further include a power management unit (PMU) 152 (a.k.a. a power supply unit (PSU). The PMU 152 may manage the power provided to the components of the information handling system 100 such as the processor 102, a cooling system such as a bank of fans, one or more drive units 114, PCIe switch 130, the video display 110, and other components that may require power via power plane connections with these components. In an embodiment, the PMU 152 may be electrically coupled to a printed circuit board associated with the information handling system to provide power to the components of the information handling system 100 via power plane connections in the printed circuit boards. The PMU 152 may be coupled to the bus 108 of the information handling system 100 to provide data regarding power provided to the various components of the information handling system 100 described herein. The PMU 152 may regulate power from a power source such as a battery 154 and A/C power 156. In an embodiment, the battery 154 may be charged via the A/C power source 156 and provide power the to the components of the information handling system 100 when A/C power 156 is removed.

In an embodiment the information handling system 100 may include a thermal cooling system 142 used to prevent overheating of the components therein. In the embodiments described herein, the thermal cooling system 142 may include one or an array or bank of fans 144 that create an airflow throughout the information handling system. Other cooling devices may work with the fans 144 such as heat pipes 145, heat sinks 146, vapor chambers 147, liquid cooling systems 148, and similar temperature regulation systems. In the example where heat sinks 146, heat pipes 145, and vapor chambers 147 are used, the one or more fans 144 may be used to pass air throughout the information handling system 100 and past these additional cooling devices in order to direct heat away from the components of the information handling system 100 and out of the information handling system 100. Heated air may also leave the information handling system 100 via exhaust vents formed anywhere on a chassis or housing of the information handling system 100. In a specific embodiment, the thermal cooling system 142 may include a temperature sensor 149 or an array of temperature sensors used to detect increases in temperature throughout the information handling system 100. The temperature sensor 149 may be communicatively coupled to the processor 102 such that temperature readings may be provided to the processor 102 or a dedicated controller or other processor so that, upon execution of computer readable program code, the fans 144 are caused to be activated.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input/output (I/O) device 116, such as a cursor control device (e.g., mouse, touchpad, or gesture or touch screen input, and a keyboard.

The network interface device 118 shown may be a wired or wireless adapter can provide connectivity to a network 120. The network interface device 118, may be one or more I/O ports for connectivity to a network for accessing the data storage information handling system. The network 120 may be a wired Ethernet connection or other wired network connection protocol in some embodiments. In other embodiments, the network 120 may be wireless such as a wide area network (WAN), a local area network (LAN), wireless local area network (WLAN), a wireless personal area network (WPAN), a wireless wide area network (WWAN), or other networks. Connectivity may be via wired or wireless connection. A wireless adapter may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter may operate two or more wireless links.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 120 can communicate voice, video or data over the network 120. Further, the instructions 124 may be transmitted or received over the network 120 via the network interface device or wireless adapter 120.

The information handling system 100 can include a set of instructions 124 that can be executed to cause the computer system to perform any one or more of the methods or computer-based functions disclosed herein. For example, instructions 124 may execute a clock distribution module 128, software agents, or other aspects or components related to clock distribution and clock control for data timing and communication timing during storage operations in some embodiments of the present disclosure. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 114 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 114, such as a bank of NVMe drives, and static memory 106 may also contain space for data storage. Further, the instructions 124 may embody one or more of the methods or logic as described herein. For example, instructions relating to the clock distribution module 128 software algorithms, processes, and/or methods for clocking control and distribution or systems for thermal controls of the thermal control system may be stored here. In a particular embodiment, the instructions, parameters, and profiles 124 may reside completely, or at least partially, within the main memory 104, the static memory 106, and/or within one or more of the disk drives 114 during execution by the processor 102 of information handling system 100. As explained, some or all of the clock distribution module 128 or thermal cooling system 142 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The clock distribution module 128 may be stored in static memory 106, or the drive unit 114 on a computer-readable medium 122 such as a flash memory or magnetic disk in an example embodiment. For example, drive unit 114 may include one or more non-volatile memory storage drives that may adhere to a non-volatile memory express (NVMe) standard for operations a PCIe® bus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include clock distribution module 128 that may be operably connected to the bus 108. The PCIe switch 130 computer-readable medium may also contain space for conducting switching tasks using memory such as for buffering or multiplexing as the PCIe standard requires for various functions. The clock distribution module 128 may, according to the present description, also perform tasks related to orchestrating a control clock signal for data transmission to the NVMe storage devices. In some embodiments, each of a plurality of clock distribution module 128 receive a control clock signal from a source clock at the DIB. Because the clock distribution modules 128 are placed at the drive baseboard 126, the number of pins at the connector between the drive baseboard 126 and the DIB and/or LCC are reduced significantly since two pins (or as much as 4 pins:

GND-signal-signal-GND) of clock signal per NVMe drive are not needed for clocking from the DIB. This is because the control clock signal either originates at the clock distribution module 128 drive baseboard 126 and is transmitted to a dependent distribution clock at the DIB, or originates at a source clock on the DIB and is distributed to other components of the information handling system 100 including the clock distribution module 128 operating as a dependent distribution clock on the NVMe drive baseboard 126 (i.e., drive mid-plane baseboard). This allows the data read, write, and access signals from the processor 102 to be relayed to the NVMe drives 114 and maintain timing via the clock distribution modules 128. The clock distribution modules 128 permit synchronized control of those operations to each of the NVMe storage devices per the clock signal coordinated on the NVMe drive baseboard 126.

In an embodiment, the clock distribution module 128 may communicate with the main memory 104, the processor 102, the video display 110, the I/O device 116, output device 110, and the network interface device 120 via bus 108, and several forms of communication may be used, including PCIe, ACPI, SMBus, a 24 MHZ BFSK-coded transmission channel, or shared memory. Driver software, firmware, controllers and the like may communicate with applications on the information handling system 100. In an embodiment, the processor 102 and/or PCIe switch may be included within the same enclosure as the NVMe storage devices. This may be referred to as a disk processor enclosure (DPE). In an alternative embodiment and in the embodiments described herein, the processor 102 and PCIe switch 130 may be formed in another enclosure that is operatively coupled to a disk attached enclosure (DAE).

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, AMD® brand processors, NVIDIA® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

As described herein, by providing the clock distribution module 128 at the NVMe drive baseboard 126 (i.e., the NVMe drive mid-plane baseboard), the pin count on any connector placed at any printed circuit board between the LCC such as the DIB and the NVMe drive baseboard 126 is reduced. In an embodiment, this connector may be physically reduced in size due to the significant reduction of pins used to transmit or receive signals between the clock distribution module 128 on the NVMe baseboard 126 and the DIB. This reduction in the number of pins used by the connector to address the clocking of processes applied to each of the NVMe storage devices may be reduced substantially. A corresponding reduction in size of the connector allows for a relatively more balanced flow of air throughout the information handling system 100 by any thermal cooling system 142 therein. Indeed, because the connectors are not blocking a significant portion of the vents to printed circuit boards, air may be more easily passed therethrough allowing for a more efficient thermal cooling system 142, less operational costs of the information handling system 100, and reduction in damage due to overheated NVMe drives or other components within the information handling system 100.

Figure 2:
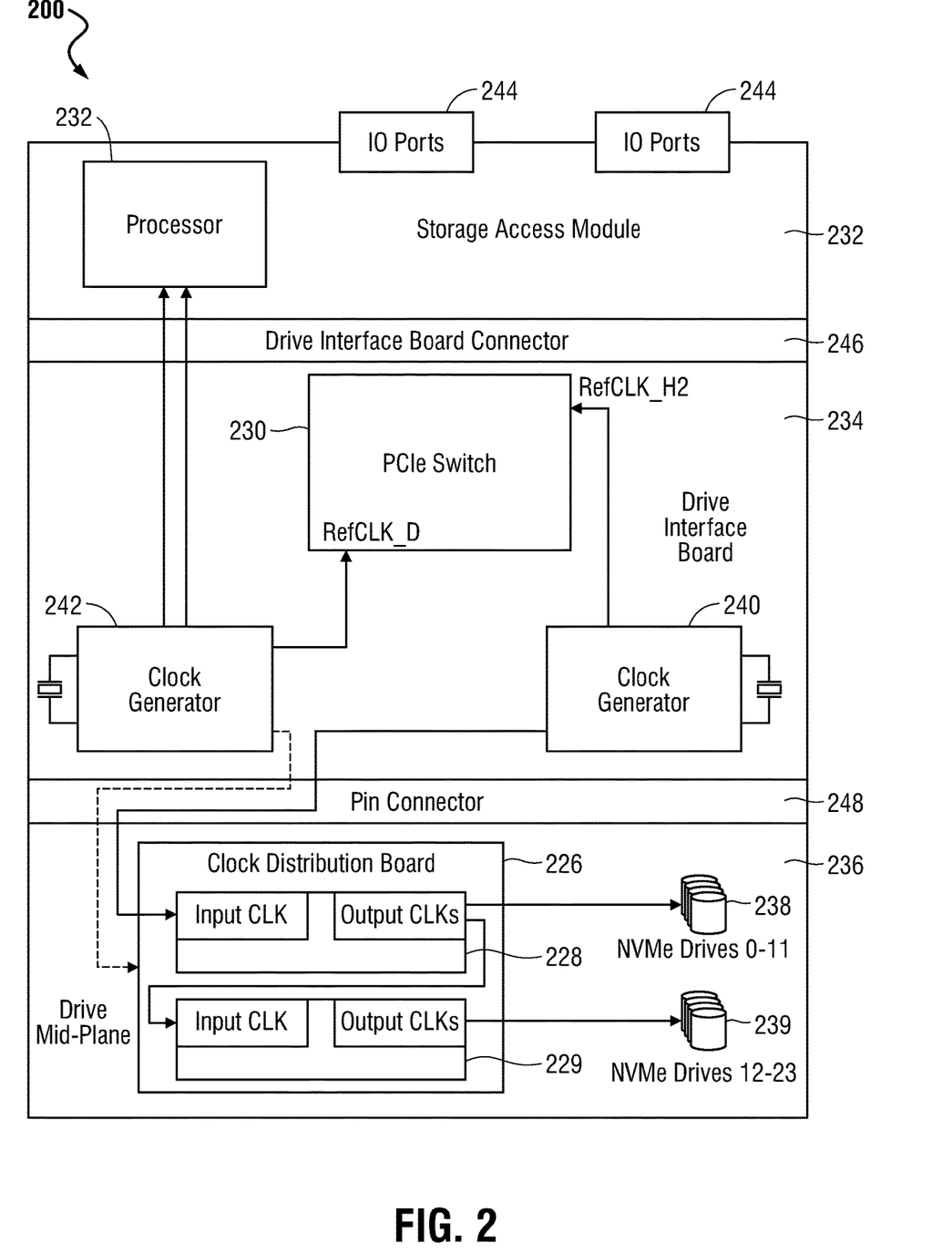
FIG. 2 is a block diagram of a distributed clock arrangement in a data storage information handling system according to an embodiment of the present disclosure.

FIG. 2 is a block diagram of a distributed clock arrangement in a data storage information handling system 200 according to an embodiment of the present disclosure. As described herein, the data storage information handling system 200 may be an information handling system used as a server. In specific embodiments, the data storage information handling system 200 may provide services to remote information handling systems such as sharing data or storage resources among these multiple clients. In a specific embodiment, the presently described data storage information handling system 200 may be used by these remote information handling systems as a data as a service (DaaS) device, a software as a service (SaaS) device, and/or a general data storage device for a local area network (LAN). Other applications of the use of the data storage information handling system 200 are contemplated by the present specification.

The data storage information handling system 200, in an embodiment, includes a storage access module 232. The storage access module 232 may include a printed circuit board (PCB) that operatively couples a number of components of the data storage information handling system 200 together. In the embodiment shown in FIG. 2, the storage access module 232 may communicatively couple a number of I/O ports 244 to a processor 202. Although FIG. 2 shows the use of a processor 202, the present specification contemplates that, for example, a signal repeater, receiving signals from a remote processor, may be used to help the signal reach the endpoint such as the switch 230 that eventually reaches the NVMe drives 238, 239. The I/O ports 244 may allow for wired communication to the data storage information handling system 200 to manipulate data maintained on or to be stored at a number of NVMe drives 238, 239. The I/O ports 244 may also serve to provide external connectivity for updating firmware at the data storage information handling system 200, processing data received at the processor 202, among other functions associated with the data storage information handling system 200. The I/O ports 244 may be any type of port such as an ethernet port, a serial port, and a USB port, among others. In a specific example embodiment, the processor 202 is a Mellanox® BlueField® data processing unit manufactured by NVIDIA® of Santa Clara Calif., U.S.A.

The storage access module 232 of the data storage information handling system 200 may further include a drive interface board connector 246. The drive interface board connector 246 may operatively couple the storage access module 232 to a drive interface board (DIB) 234. The drive interface board connector 246 may be any type of connector that allows for communication from the processor 202 to access, for example, a PCIe switch 230 of the DIB 234. By providing a drive interface board connector 246 within the data storage information handling system 200, the storage access module 232 may be selectively removable from the DIB 234 and data storage information handling system 200 for hardware upgrades or other exchange of hardware within the storage access module 232.

The DIB 234 may include one or more clock generators 240, 242. As described herein, any of these clock generators 240, 242 may set a controlling clock signal for the data storage information handling system 200 or to transmit the controlling clock signal to control a dependent clock signal generated by another dependent clock generator. For example, the first clock generator 242 may generate a control clock signal for operation of the PCIe switch 230, the processor 202, and the clock distribution modules 228, 229. In this embodiment, the first clock generator 242 may act as a source clock generator that sets a clock signal for all other dependent clocks including the clock distribution modules 228, 229. In another embodiment, an existing DIB 234 design may include the first source clock generator 242 that provides controlling clock signals to the processor 202 and a PCIe switch 230. In such an arrangement, the first source clock generator 242 may have previously provided clocking to NVMe drives 238, 239 via PCIe switch 230 on plural pins via pin connector(s) 248. However, adding a second clock generator 240 to the DIB 234 may add a second source clock generator 240 to provide controlling clock signals to clock distribution modules 228, 229 acting as dependent clock. Thus, only a clock signal to at least one clock distribution module 228 or 229 is necessary across pin connector 248. Second source clock generator 240 may also provide a reference clock signal (e.g., REF_CLK_H2) to PCIe switch 230 to coordinate communication timing from the PCIe switch 230 to the NVMe drives 238, 239. In this way, a previous DIB 234 design may be upgraded to reduce connector size for pin connector 248 by adding a second source clock generator 240. In one alternative embodiment, second clock generator 240 may depend on a controlling clock signals received from the first, source clock generator 242 or from one of the clock distribution modules 228 or 229 operating as a control source clock. In another alternative embodiment, the first and second clock generators 240, 242 may act as dependent clocks that transmit a clock signal received from one or more of the clock distribution modules 228, 229 acting as controlling source clock generators.

As described, the DIB 234 includes a PCIe switch 230. The PCIe switch 230 may be used to connect the large number of NVMe drives 238, 239 to the processor and effectively transmit those data, commands, and clocking signals to the NVMe drives 238, 239 for quick and efficient access to data storage on the NVMe drives 238, 239. Again, with the rising usage of PCIe-switched storage drives such as the NVMe drives 238, 239 in data storage systems 200, an increase in the number of signals that connect the processor 202 and PCIe switch 230 to the drives is realized. Since the processor 202 and PCIe switch 230 do not reside on the same drive PCB board, the increased number of signals translates to an increase in connectors sizes and pin count between the PCB boards such as between the DIB 234 and the drive mid-plane baseboard 236 that is the NVMe drive baseboard associated with the NVMe drives 238, 239. Because of the increase number of signals transmitted from the processor 202, to the PCIe switch 230, and onto the NVMe drives 238, 239, the pin connectors 248 interfacing the DIB 234 with the drive mid-plane baseboard 236 will grow larger.

To alleviate the relatively larger pin connectors 248, the data storage information handling system 200 includes any number of clock distribution modules 228, 229 placed on a clock distribution board 226 at the drive mid-plane baseboard 236. The clock distribution board 226 may be operatively coupled to the pin connectors 248 and, accordingly to the PCIe switch 230 and processor 202. Thus, a fewer clock signals and pins may be required from source clock generator 242 or 240 across pin connector 248 to provide a control clock signal to at least one clock distribution module 228. Clock distribution module 228 may then replicate, synchronize, and distribute the clock signal to several NVMe drives 238, 239. Clock distribution module 228 may also distribute a controlling clock signal to other clock distribution modules 229 (e.g., 0-11). The other dependent clock distribution modules 229 may then replicate, synchronize, and distribute clock signals to even more NVMe drives 230 (e.g., 12-23). The clock distribution board 226 may be a PCB that operatively couples a first clock distribution module 228 to a second clock distribution module 229 as well as operatively couples the first clock distribution module 228 and second clock distribution module 229 to a first set of NVMe drives 238 and second set of NVMe drives 239, respectively.

The pin connector 248 may have fewer pins dedicated to checking signals for NVMe drives 238, 239 thereby significantly reducing the size of each pin connector 248. In this specific embodiment, because the first clock distribution module 228 and second clock distribution module 229 distribute the clock signals to the first set of NVMe drives 238 and second set of NVMe drives 239 from the drive mid-plane baseboard 236, the pin connector 248 may include sideband signal pins, ground pins, and, for each port, signal pins. This results in some embodiments, with nine pins at most in the pin connector 248.

This is in contrast to other pin connectors that include, at least, two pins with each number of NVMe drives being addressed via the PCIe switch and pin connector for clocking. With the PCIe addressing each of the NVMe drives individually, each drive must have two data ports dedicated to each drive, 2 clocking wires per port (4 wires) and a ground pin at the pin connector. With a potential to have 24 drives in the data storage system, this pin count would meet and exceed 145 pins. However, where the first clock distribution module 228 and second clock distribution module 229 each address the first set of NVMe drives 238 and second set of NVMe drives 239 as distributed clock signal sources, the number of pins is significantly reduced thereby significantly reducing the size of the pin connector 248 as described herein. The smaller sized pin connector 248 allows for an increased airflow across the first and second set of NVMe drives 238, 239 as well other components of the information handling system (e.g., server). Still further in some embodiments, traditional right-angle backplane connectors may be avoided using lower profile edge connectors instead, for example, thereby also increasing the airflow throughout the data storage information handling system 200. The application of the use of the first and second clock distribution modules 228, 229 presented herein is for PCIe devices and, more specifically, for storage systems that interface with, for example, a PCIe switch 230. PCIe-based data storage systems 200 implementing these solutions may be used to meet the demands of, for example, serial AT attachment (SATA) and serial attached SCSI (SAS) technologies used to access hard drives or other storage devices such as the first and second sets of NVMe drives 239.

Although FIG. 2 shows a specific layout of the components of the data storage information handling system 200, the present specification contemplates that the pin connector 248 described herein used to communicatively couple the PCIe switch 230 to the clock distribution board 226 and its clock distribution modules 228, 229 may be implemented in any other type of arrangement. For example, in other embodiments the SAM 232 and DIB 234 may be a single PCB board that may be removed in order to update hardware within the data storage information handling system 200. Additionally, FIG. 2 shows a single combination of SAM 232 and DIB 234 PCBs, however the present specification contemplates that multiple SAMs 232 and DIBs 234 may be communicatively coupled to the NVMe drives 238, 238 via the clock distribution modules 228, 229 and the pin connector 248. In such an embodiment, the clock signal, whether generated at the one or more clock generators 240, 242 or at the clock distribution modules 228, 229, may also be provided to the components of these additional SAM 232 and DIB 234 printed circuit boards.

Figure 3A:
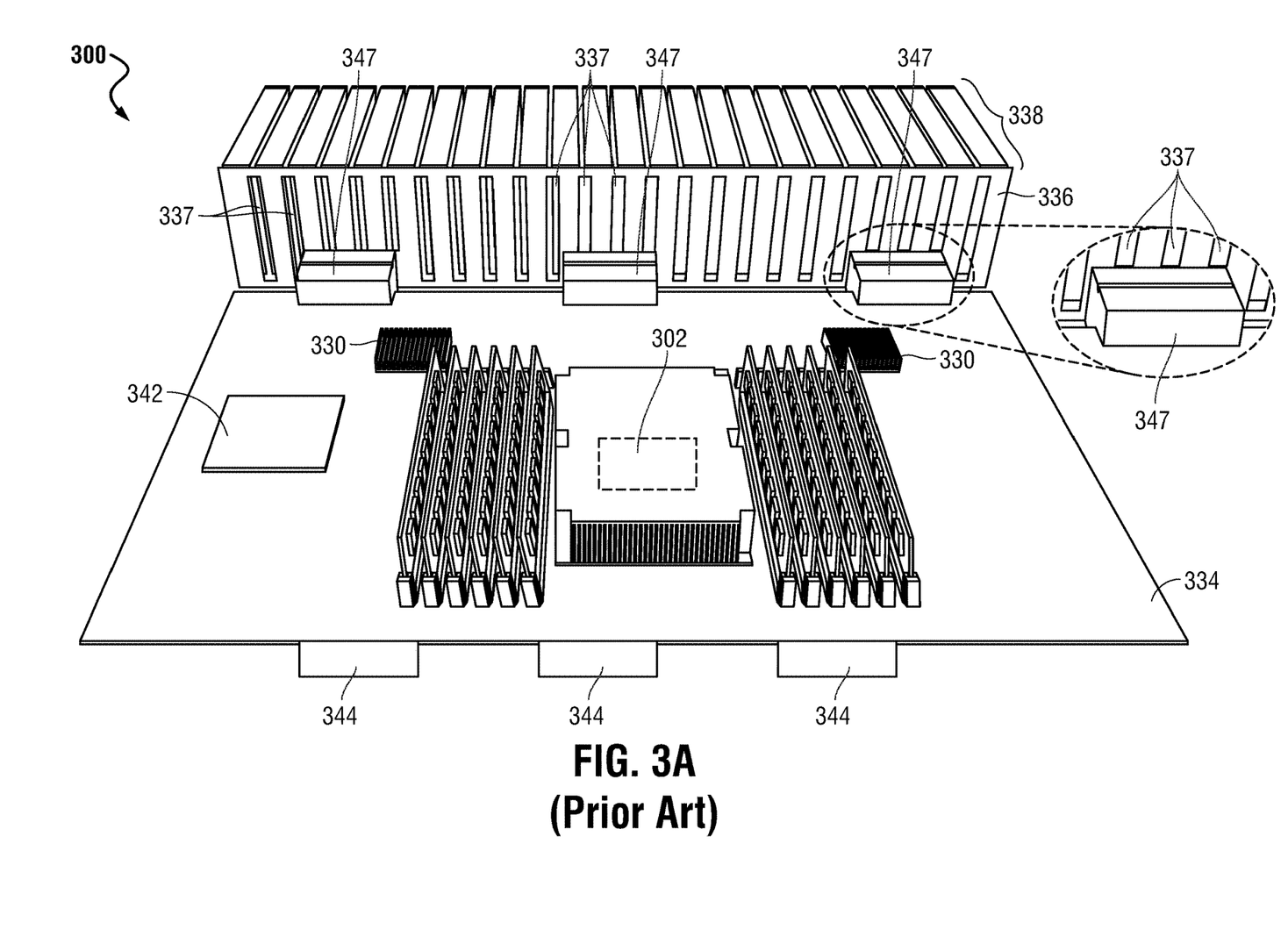
FIG. 3A is a perspective graphical diagram view of a data storage information handling system according to examples of connector systems used in the prior art.

FIG. 3A is a perspective graphical diagram view of a data storage information handling system 300 according to examples of previous clocking systems used in the prior art. The data storage information handling system 300 may be an information handling system used as a server. The data storage information handling system 300 shows a link controller card (LCC) 334. The LCC 334 may include a PCB that operatively couples a number of components of the data storage information handling system 300 together. As shown in FIG. 3A, the LCC 334 may communicatively couple a number of I/O ports 344 to a processor 302. The I/O ports 344 may allow for wired communication to the data storage information handling system 300 to manipulate data maintained on or to be stored at a number of NVMe drives 338.

In this prior art depiction of a data storage information handling system 300, the LCC 334 may be a source clock generator 342 to set a controlling clock signal for the data storage information handling system 300. For example, the clock generator 342 may generate a control clock signal for operation of the PCIe switch 330 and the processor 302, among other components of the data storage information handling system 300. The source clock generator 342 must also provide clocking signals to the plurality of NVMe drives 338 via connection from the LCC 334 to the NVMe drive mid-plane baseboard 336 in the configuration shown in FIG. 3A. Each NVMe drive requires at least two wires for provision of clocking signals. With the rising usage of PCIe-switched storage drives such as the NVMe drives 338 in data storage information handling system 300, as well as the timing requirements for clocking, an increase in the number of signals that connect the processor 302, source clock generator 342, and PCIe switch 330 to the drives 338 is realized. Since the source clock 342, the processor 302, and PCIe switch 330 do not reside on the same PCB board as the NVMe drives 338, the increased number of signals translates to an increase in connectors 348 sizes and pin count between the PCB boards. For example, larger connectors 348 such as between the LCC board 334, for example, and the drive mid-plane baseboard 336 that is the NVMe drive baseboard associated with the NVMe drives 338 are needed. Because of the increased number of signals transmitted from the source clock 342, the processor 302, and the PCIe switch 330 to the NVMe drives 338, the pin connectors 348 interfacing the LCC board 334 with the drive mid-plane baseboard 336 are increased accordingly. As depicted in FIG. 3A these larger connectors 348 have been placed against a vertical drive mid-plane baseboard 336 and may block a number of vents 337 formed through the vertical drive mid-plane baseboard 336. These vents 337 were formed through the vertical drive mid-plane baseboard 336 so that a bank of fans (not shown) may create an airflow through the vents 337 and the remaining portions of the data storage information handling system 300. Due to the large form of the connectors 348, the airflow that may passed through the vents 337 is reduced. This is seen specifically in the magnified image of a connector 348 in FIG. 3A showing that the connector 348 is blocking portions of three of these vents 337. Again, as the number of NVMe drives 338 increases, the size or number of these connectors 348 also increase thereby limiting airflow through the vertical drive mid-plane baseboard 336.

Figure 3B:
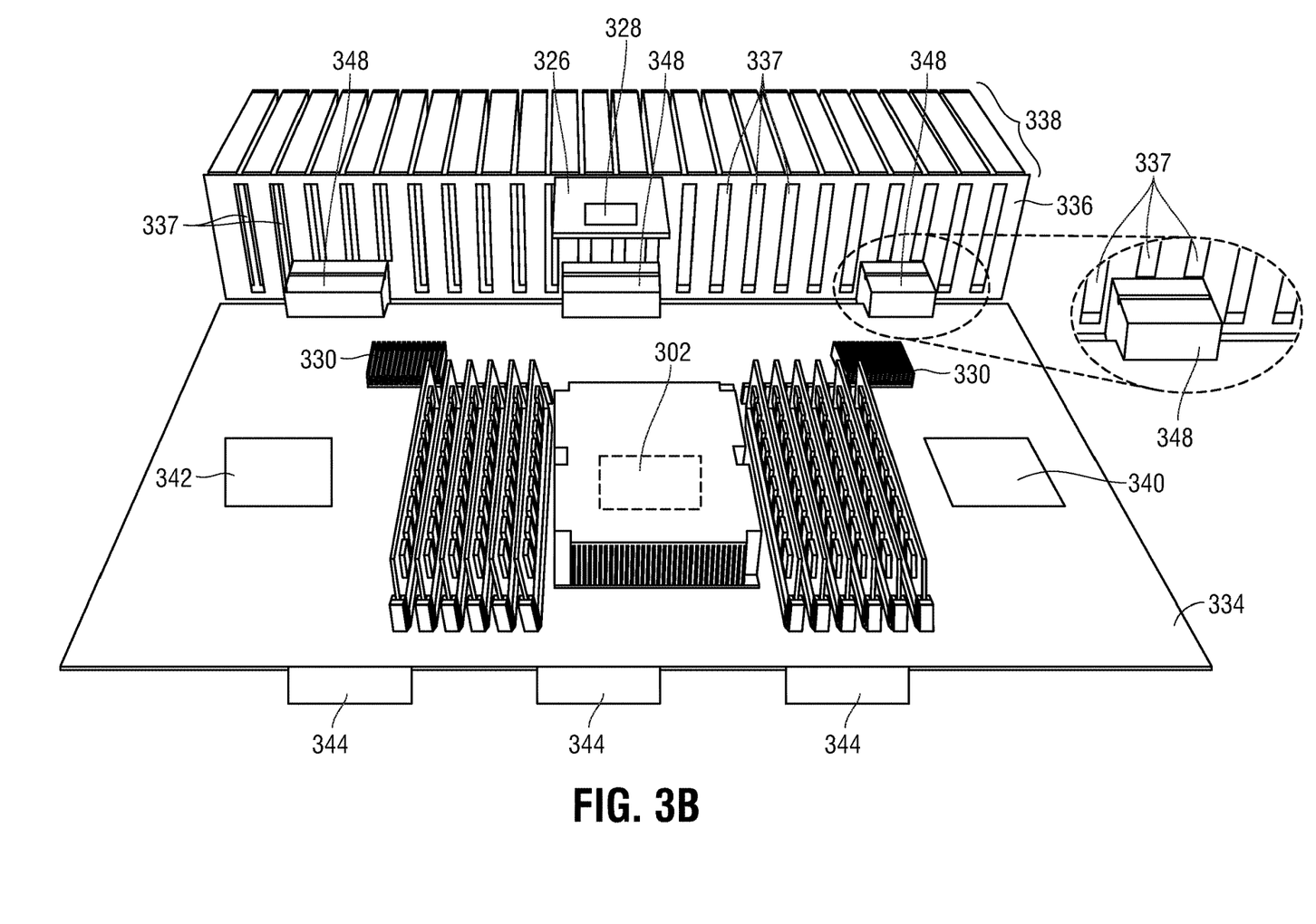
FIG. 3B is a perspective graphical diagram view of a data storage information handling system according to an embodiment of the present disclosure.

FIG. 3B is a perspective graphical diagram view of a data storage information handling system 300 according to an embodiment of the present disclosure. The data storage information handling system 300 may be an information handling system used as a server. In specific embodiments, the data storage information handling system 300 may provide services to remote information handling systems such as sharing data or storage resources among these multiple clients. For example, in some embodiments, the presently described data storage information handling system 300 may be used by these remote information handling systems as a data as a service (DaaS) device, a software as a service (SaaS) device, and/or a general data storage device for a local area network (LAN). Other applications of the use of the data storage information handling system 300 are contemplated by the present specification.

The data storage information handling system 300, in an embodiment, includes a link controller card (LCC) 334. In an embodiment, the LCC 334 may include any of a storage access module and a drive interface board (DIB) along with any other printed circuit board (PCB) that allows for the transmission of data signals and clock signals amongst the components provided on the LCC 334. As described in further embodiments, the DIB and storage access module may be modular PCBs that provide for flexibility in updating components among generations of data storage information handling systems 300 or for conducting repairs to data storage information handling systems 300. In the embodiment shown in FIG. 3B, the LCC 334 may communicatively couple a number of I/O ports 344 to a processor 302. The I/O ports 344 may allow for wired communication to the data storage information handling system 300 to manipulate data maintained on or to be stored at a number of NVMe drives 338. The I/O ports 344 may also serve to provide external connectivity for updating firmware at the data storage information handling system 300, processing data received at the processor 302, among other functions associated with the data storage information handling system 300. For example, the I/O ports 344 may be used as an interface with a network interface device for connectivity to a network such as an Ethernet network or other wired network system.

The data storage information handling system 300 of FIG. 3B may include one or more clock generators 342. As described herein, this clock generator 342 may act as a source clock to set a controlling clock signal for the data storage information handling system 300 in some embodiments. In other embodiments, a clock generator 342 may transmit the controlling clock signal from another source clock generator on the LCC 334 or from a source clock at another location such as a clock distribution module 328 to control a dependent clock signal generated by another dependent clock generator.

In one example embodiment, the clock generator 342 may generate a control clock signal for operation of the PCIe switch 330, the processor 302, and the clock distribution modules 328 located at the drive mid-plane baseboard 336. In this embodiment, the clock generator 342 may act as a source clock generator that sets a clock signal for all other dependent clocks including the clock distribution module 328 or modules at the drive mid-plane baseboard 336.

In another embodiment, an existing LCC 334 design may include a first source clock generator 342 that provides controlling clock signals to the processor 302 and a PCIe switch 330. In such an arrangement, the first source clock generator 342 may have previously provided clocking to NVMe drives 338 via PCIe switch 330 on plural pins via pin connector(s) 348. However, adding a second clock generator 340 to the LCC 334 may add a second source clock generator 340 to provide controlling clock signals to clock distribution modules 328 acting as a dependent clock to distribute this controlling clock signal to the NVMe drives 338.

With the present embodiments where a source clock generator 340 or a second, optional, source clock generator 340 at the LCC 334 provide a controlling clock signal to the clock distribution module, only a clock signal to at least one clock distribution module 328 is necessary across pin connector 348. Second source clock generator 340 may also provide a reference clock signal to the PCIe switch 330 to coordinate communication timing from the PCIe switch 330 to the NVMe drives 338. In this way, a previous LCC 334 design may be upgraded to reduce connector size for pin connector 348 without a need to re-engineer the DIB or storage access module of the LCC. In one alternative embodiment, a second clock generator may depend from controlling clock signals received from the first source clock generator 342 or from one of the clock distribution modules 328 operating as a control source clock. In another alternative embodiment, the first clock generator 342 and second clock generator 340 may act as dependent clocks that transmit a clock signals received from one or more of the clock distribution modules 328 acting as controlling source clock generators.

To alleviate those relatively larger pin connectors 348 shown and described in FIG. 3A, the data storage information handling system 300 includes any number of clock distribution modules 328 placed on a clock distribution board 326 at the drive mid-plane baseboard 336. The clock distribution board 326 may be operatively coupled to the pin connectors 348 and, accordingly, to the PCIe switch 330 and processor 302. Thus, a fewer clock signals and pins may be required from source clock generator 342 across pin connector 348 to provide a control clock signal to at least one clock distribution module 328. Clock distribution module 328 may then replicate, synchronize, and distribute the clock signal to several NVMe drives 338. Clock distribution module 328 may also distribute a controlling clock signal to other clock distribution modules that may be present on the clock distribution board 326. The other dependent clock distribution module (not shown) may then replicate, synchronize, and distribute clock signals to even more NVMe drives 338. In certain embodiments, each of the clock distribution modules 328 may replicate, synchronize, and distribute clock signals to a certain number of NVMe drives 338 within a block of NVMe drives 338. The clock distribution board 326 may be a PCB that operatively couples a first clock distribution module 328 to a second clock distribution module as well as operatively couples the first clock distribution module 328 and second clock distribution module to a first set of NVMe drives 338 and second set of NVMe drives 338, respectively.

The pin connector 348 may have fewer pins as depicted in the magnified image of a connector 348 in FIG. 3B. This magnified image shows that the connector 348 is blocking portions of two of the vents 337. In this specific embodiment, because the first clock distribution module 328 distributes the clock signals to the NVMe drives 338 from the LCC 334, the pin connector 348 may include sideband signal pins, ground pins, and, for each port, signal pins. This results in some embodiments, with nine pins at most in the pin connector 348. This reduction in size of the connectors 348 results in better airflow through the data storage information handling system 300 and increased efficiency of the cooling systems placed within the data storage information handling system 300.

This is in contrast to other pin connectors that include, at least, two pins with each number of NVMe drives being addressed via the PCIe switch and pin connector for clocking such as would be necessary in the system shown in FIG. 3A. With the PCIe addressing each of the NVMe drives individually, each drive must have two data ports dedicated to each drive, 2 clocking wires per port (4 wires) and a ground pin at the pin connector. With a potential to have 24 drives in the data storage system, this pin count would meet and exceed 145 pins. However, where the first clock distribution module 328 on the drive mid-plane baseboard 336 is used to address clocking for a set of NVMe drives 338 as a distributed clock signal source, the number of pins is significantly reduced since the number of clocking signals to LCC board 334 is reduced, thereby significantly reducing the size of the pin connector 348 as described herein.

Although FIG. 3B shows a specific layout of the components of the data storage information handling system 300, the present specification contemplates that the pin connector 348 described herein used to communicatively couple the PCIe switch 330 to the clock distribution board 326 and its clock distribution modules 328 may be implemented in any other type of arrangement.

Figure 4:
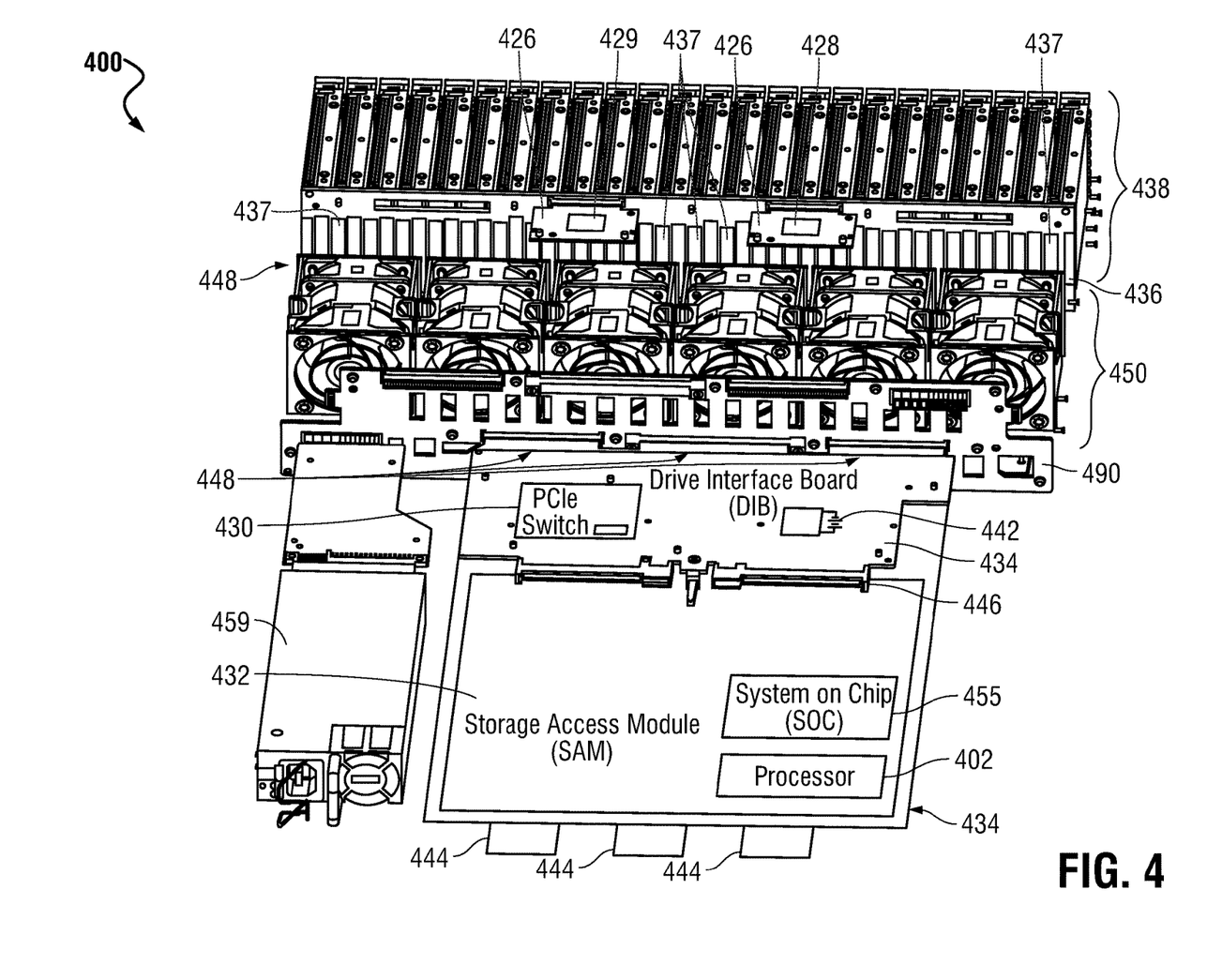
FIG. 4 is a perspective graphical diagram view of a data storage information handling system according to an embodiment of the present disclosure.

FIG. 4 is a perspective graphical diagram view of a data storage information handling system 400 according to an embodiment of the present disclosure. The information handling system 400 shows a series of NVMe drives 438 placed behind a drive mid-plane baseboard 436 serving as an NVMe drive baseboard. Mid-plane baseboard 436 may be a vertical PCB in some embodiments and may have a plurality of vents 437 cut into the mid-plane baseboard 436 to permit airflow to pass across the NVMe drives 438 among other components of the data storage information handling system 400. In this embodiment, a plurality of fans 450 may be placed between the drive mid-plane baseboard 436 and a separate vertical support structure 490 to which pin connectors 448 is coupled. As described herein, the plurality of fans 450 may operate as a thermal control cooling system within the data storage system 400 that cools the NVMe drives 438 and other components of the data storage system 400. The drive mid-plane baseboard 436 and other vertical support structures may include vents or slats such as 437 cut through them to allow airflow throughout the data storage system 400. Because the pin connector 448 is operatively coupled to a vertical support structure such as vertical PCB 490, it may prevent airflow through some of these slats. As such, the present specification describes a system and method that reduces the size of the pin connector 248 by relying on a clock distribution module 428, 429 for the distribution of clock signals to the NVMe drives 438. As shown, a low-profile edge connector may be used. By relying on the clock distribution module 428, 429 to address clocking the NVMe drives 438 directly instead of, for example, a PCIe switch 430, the number of pins within the pin connector 448 is reduced as described herein. The vertical support structure 490 is operatively coupled to drive mid-plane baseboard 436 in the embodiment via electric and data connections such as via a PCB connector board passing under bank of fans 450. For example, a PCB connector board or connection cabling may run under the cooling fans 450 to drive the mid-plane baseboard 436. Another set of pin connectors 448 may then connect to the drive mid-plane baseboard 436. Use of the clock distribution module 428, 429 can reduce this connection size as well as reduce the size of any additional pin connectors 448. The vertical support structure 490, drive mid-plane baseboard 436, and PCB connector board or cabling may comprise a drive midplane for operatively coupling the I/O ports 444, processor 402, and PCIe switch 430 as well as other components to the NVMe drives 450.

In addition to the pin connector 448 and plurality of fans 450, the data storage system 400 of FIG. 4 may include a storage access module (SAM) 432. The SAM 432 may include a printed circuit board (PCB) that operatively couples a number of components of the data storage system 400 together. The SAM 432 may, for example, communicatively couple a number of I/O ports 444 to a processor formed on the SAM 432. The I/O ports 444 may allow for wired communication to the data storage system 400 to manipulate data maintained or to be stored on a number of NVMe drives 438. SAM 432 may also provide for updating firmware at the data storage system 400, processing data received at the processor, among other functions associated with the data storage system 400. The I/O ports 444 may be any type of port such as a an ethernet port, a serial port, and a USB port among others and may operate with a network interface device in some embodiments.

The SAM 432 of the data storage information handling system 400 may further include a drive interface board connector 446. The drive interface board connector 446 may operatively couple the storage access module 432 to a drive interface board (DIB) 434. The drive interface board connector 446 may be any type of connector that allows for communication from the processor to access, for example, a PCIe switch 430 of the DIB 434. By providing a drive interface board connector 446 within the data storage system 400, the storage access module 432 may be selectively removable from the DIB 434 in the data storage information handling system 400 for hardware upgrades or other exchange of hardware within the data storage system 400 and on the storage access module 432 the DIB 434, or the NVMe drives 438.

The DIB 434 may include one or more clock generators. As described herein, any of these clock generators may set a controlling clock signal for the data storage system 400 or transmit a clock signal generated by another signal clock generator. For example, a source clock generator may generate a controlling clock signal for operation of the PCIe switch 430, the processor, and the clock distribution modules 428, 429. In this embodiment, the source clock generator may act set a clock signal for all other dependent clocks including any other dependent clock generator as well as the dependent clock distribution modules 428, 429. In an alternative embodiment, any clock generator on the DIB 434 may act as dependent clocks that receives a clock signal received from one or more of the clock distribution modules 428, 429 acting as source clock generators.

As described, the DIB 434 includes a PCIe switch 430. The PCIe switch 430 may be used to connect the large number of NVMe drives 438 to the processor and effectively transmit data, instructions, or clock signals to the NVMe drives 438 for quick and efficient access to data storage on the NVMe drives 438. Again, with the rising usage of PCIe-based system for storage drives such as the NVMe drives 438 in the data storage information handling system 400, an increase in the number of signals that connect the processor and PCIe switch 430 to the drives is realized. Since the processor and PCIe switch 430 do not reside on the same drive PCB board, the increased number of signals translates to an increase in connectors sizes and pin count between the PCB boards such as between the DIB 434 and the drive mid-plane baseboard 436 associated with the NVMe drives 438. Because of the increased number of signals transmitted from the processor, to the PCIe switch 430, and onto the NVMe drives 438, the pin connectors 448 interfacing the DIB 434 with the drive mid-plane baseboard 436, as well as the intermediate vertical fan support structure 490, will need to be larger. The present embodiments alleviate and streamline pin connection 448 sizes.

To alleviate the relatively larger pin connectors 448, the data storage system 400 includes a number of clock distribution modules 428, 429 placed on a clock distribution boards 426 at the drive mid-plane baseboard 436. The clock distribution board 426 may be operatively coupled to the pin connectors 448 and, accordingly to the PCIe switch 430 and processor. Fewer clocking pins may be required with the clock distribution modules 428, 429 mounted on the drive mid-plane baseboard 436 near the NVMe drives 438. The clock distribution board 426 may be a PCB that operatively couples a first clock distribution module 428, in an embodiment, to a second clock distribution module 429 as well as operatively couples the first clock distribution module 428 and second clock distribution module 429 to a first set of NVMe drives 438 and second set of NVMe drives 439, respectively. In this embodiment, the array of NVMe drives 438 may be bifurcated into two groups (or more) to be accessed by the first clock distribution module 428 the second clock distribution module 429 (or additional clock distribution modules).

The data storage information handling system 400 may further include a power management unit (PMU) 459. The PMU 459 may manage the power provided to the components of the data storage information handling system 400 such as the processor 402, a cooling system such as a plurality of fans 450, a PCIe switch 430, the NVMe drives 438, among other components of the data storage information handling system 400 via a power plane via a vertical support PCB 490. In an embodiment, the PMU 459 may be electrically coupled to a printed circuit board associated with the information handling system to provide power to the components of the data storage information handling system 400. In an example embodiment, the PMU 459 and power source may be operatively coupled to a support structure PCB 490 to provide power to one or more cooling fans 450 as well as other components as described above. The PMU 459 may regulate power from a power source such as a battery (not shown) and A/C power adapter (not shown). In an embodiment, the battery may be charged via the A/C power source and provide power the to the components of the data storage information handling system 400 when A/C power is removed.

Figure 5:
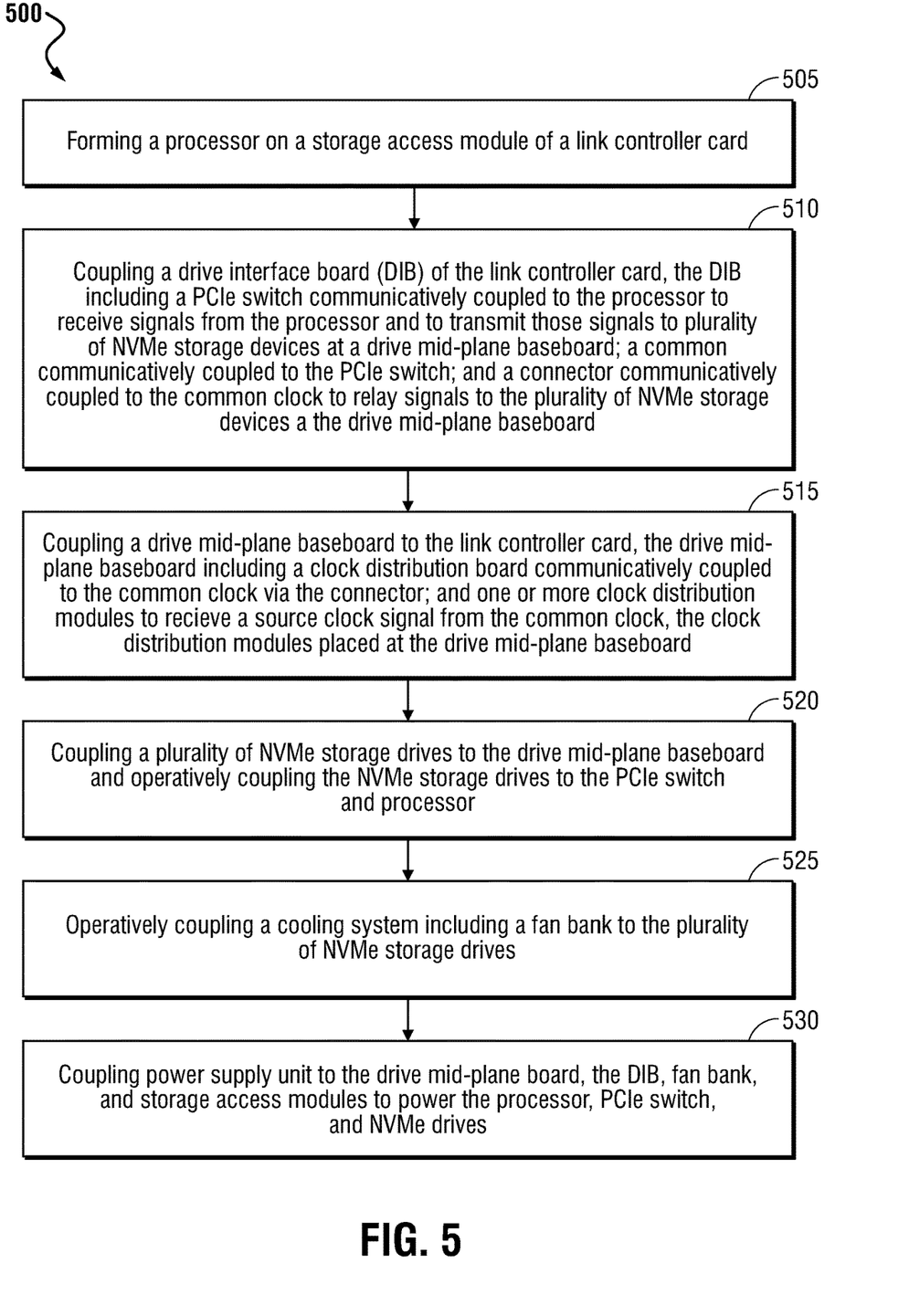
FIG. 5 is a flow diagram illustrating a method of assembling an NVMe-based server with distributed clock signals according to an embodiment of the present disclosure.

FIG. 5 is a flow diagram illustrating a method 500 of forming an NVMe-based server for distributing clock signals according to an embodiment of the present disclosure. The method 500 may include, at block 505 with forming a processor on a link controller card (LCC). As described herein, the SAM and DIB may form parts of an LCC. Although, in some embodiments, the LCC may be a single PCB, the ability to separate the LCC into a SAM and DIB may allow for more flexibility in hardware replacement and augmentation as described herein. Thus, although the present specification describes the LCC as being separated into a SAM PCB and DIB PCB coupled via connectors, the present specification contemplates that other arrangements may be realized without going beyond the scope of the present specification.

In an embodiment, the method 500 may proceed to block 510 to include coupling a DIB (or, alternatively, designating a portion of the LCC as a DIB) the link controller card. The DIB may be a PCB board or a portion of the LCC upon which a PCIe switch integrated circuit may be mounted. The PCIe switch is communicatively coupled to the processor to receive signals from the processor and to transmit those signals to a plurality of NVMe storage devices at a drive mid-plane baseboard at block 510. This process of forming the DIB at block 510 may further include forming a source clock on the DIB and communicatively coupling it to the PCIe switch. The DIB mounting has a connector communicatively coupled to the source clock and PCIe switch to relay signals to the plurality of NVMe storage devices at the drive mid-plane baseboard. These components, along with others, may form the DIB that interfaces with clock distribution modules formed on a drive mid-plane baseboard via the connector described herein.

The connector between the DIB and the drive mid-plane, including the drive mid-plane baseboard and other mid-plane boards in some other embodiments, may be a low-profile edge connector, in some example embodiments. A low-profile edge connector may allow for streamlined airflow to pass through any vents that may be formed in any vertical PCBs within the data storage information handling system. The edge connector may have a significantly low profile and prevent blockage of the vents formed on any vertical PCB described herein. Alternatively, other types of pin connectors may be used such as the 90-degree connectors shown and described in connection with FIGS. 3A and 4. In this specific embodiment, because of the use of one or more clock distribution modules, the size of the 90-degree connectors is significantly reduced.

As described herein, the common clock may set a source clock signal for the data storage system or transmit a source clock signal generated by another clock generator. For example, a common clock may generate a source clock signal for operation of the PCIe switch, the processor, and distribute that source clock signal to the clock distribution modules as described herein. In this embodiment, the common clock may act as a source clock generator that sets a clock signal for all other dependent clocks including other clock generators and, specifically, the clock distribution modules on the drive mid-pane board. In an alternative embodiment, the common clock may act as a dependent clock that transmits a source clock signal received from one or more of the clock distribution modules on the drive mid-plane baseboard acting as source clock generators.

The PCIe switch may be used to connect a large number of NVMe drives to the processor and effectively transmit those signals and data to the NVMe drives for quick and efficient access to data or storage locations on the NVMe drives. Again, with the rising usage of PCIe-storage drives such as the NVMe drives in data storage systems, an increased number of signals need be coupled between the processor and PCIe switch and the drives.

The method may further include forming the drive mid-plane baseboard as described at block 515. Here, the drive mid-plane baseboard may include a clock distribution board communicatively coupled to the common clock of the DIB via the connector, a plurality of clock distribution modules to receive a control clock signal from the source clock. The clock distribution modules are placed at the drive baseboard at block 515. At block 520 a plurality of NVMe drives may be connected to the drive mid-plane baseboard with operatively coupling the NVMe storage drives to the PCIe switch and processor. The NVMe drives may be connected in a bank of drives to a series of drive connectors mounted on the drive mid-plane board. The drive mid-plane board may provide power and data connectivity through the PCB to the plurality of NVMe storage drives. Further, the drive mid-plane board may have a plurality of vents positioned to allow airflow between and to the plurality of NVMe storage drives in some embodiments. The drive mid-plane board may also have one or more clock distribution modules operatively coupled for interfacing with clock generators on the DIB or storage access module and to provide clocking signals to the plurality of NVMe storage drives. Finally, the drive mid-plane board may support connectivity through a connecting PCB board from a DIB and a vertical support structure PCB for supporting one or more cooling fans in some embodiments.

The clock distribution module described at block 515 may, according to the present description, perform tasks related to orchestrating a source clock signal for data transmission to the NVMe storage devices. In some embodiments, each of a plurality of clock distribution module receives a source clock signal from a common clock at the DIB. Because the clock distribution modules are placed at the drive baseboard, the number of pins necessary for clocking signals to each NVMe at the connector between the clock distribution modules and the DIB and/or LCC are reduced significantly. This is because the source clock signal either originates at the clock distribution module and is transmitted to a common clock at the DIB, or originates at a common source clock on the DIB and is distributed to the clock distribution module on the drive mid-plane baseboard. The source clock signal is also distributed to other components of the information handling system. This allows the data read, write, and access signals from the processor to be relayed to the clock distribution modules and the clock distribution modules to synchronize those operations to each of the NVMe storage devices per the clock signal.

As described herein, by providing the clock distribution module at the NVMe drive mid-plane baseboard, the pin count on any connector placed at any vertical printed circuit board between the LCC and drive mid-plane baseboard. In an embodiment, this connector may be physically reduced in size due to the significant reduction of pins used to transmit clock signals to or receive clock signals from the clock distribution module. Such a reduction in size of the connector allows for a relatively more balanced flow of air throughout the information handling system by any cooling system therein. Indeed, because the connectors are not blocking a significant portion of the vertical printed circuit boards such as the drive mid-plane baseboard, air may be more easily passed through the vents or slats formed therein allowing for a more efficient cooling and less operational costs of the information handling system. Also, a reduction in damage due to overheated NVMe drives or other components within the information handling system is realized.

In an embodiment, the drive mid-plane baseboard is a vertical drive mid-plane baseboard. In these embodiments, the connectors may block a number of vents formed through the vertical drive mid-plane baseboard. These vents were formed through the vertical drive mid-plane baseboard so that a bank of fans may create an airflow through the vents and the remaining portions of the data storage information handling system. The 90-degree connectors may block these vents. However, with the use of the clock distribution modules, the size of these connectors is reduced with fewer clocking signals needing to be relayed thereby increasing the airflow through these vents.

The method may proceed at block 525 with operatively coupling a cooling system to the components of the data storage information handling system. The cooling system may include a fan bank that, when activated, creates an airflow to pass throughout the data storage information handling system. The cooling system may be operatively coupled to a processor along with a temperature sensor to allow the processor or other controller to turn on the fans of the fan bank or increase or decrease the speed of the fans as temperatures within the data storage information handling system changes. The fan bank may be mounted to any type of fan support structure PCB within the data storage information handling system. As described herein, any vents or slats formed in vertical PCBs described herein may allow airflow to be passed through the data storage information handling system during activation of the fans.

The method also includes, at block 530, with operatively coupling a power supply unit to the drive mid-plane baseboard, the DIB, fan bank, and storage access modules to power the processor, PCIe switch, and NVMe drives. The power supply may, in an embodiment include a battery and an A/C power source. The power supply may provide A/C power to the components of the data storage information handling system as described herein and, when A/C power is not available, provide power via the battery. The power supply may be coupled to fans within the fan bank in order to provide driving power to the fans during operation of the fans.

The blocks of the flow diagram of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A non-volatile memory express (NVMe) based storage system, comprising:
   a processor;
   an input/output (I/O) port operable to couple to a data network;
   a drive interface board (DIB), including:
      a PCIe switch communicatively coupled to the processor to receive signals from the processor to a plurality of NVMe storage devices; and
      a source clock communicatively coupled to the PCIe switch;
   a connector communicatively coupling the DIB and configured to relay clock signals to a plurality of NVMe drives that are operatively coupled to a drive mid-plane baseboard; and
   the drive mid-plane baseboard communicatively coupled to the source clock and the PCIe switch, the drive mid-plane baseboard including:
      a clock distribution module to receive a source clock signal from the source clock, the clock distribution module placed at the drive baseboard to distribute the clock signals to the plurality of NVMe storage devices.

2. The NVMe-based storage system of claim 1, further comprising:
   the drive mid-plane baseboard including a plurality of vents;
   a cooling system including a plurality of fans placed between the drive interface board and the drive mid-plane baseboard; and
   the connector communicatively coupling the source clock to the distribution module on the drive mid-plane baseboard comprising clock signal pins between the source clock and the clock distribution module.

3. The NVMe-based storage system of claim 1, wherein the clock distribution modules operate as dependent clocks to the source clock.

4. The NVMe-based storage system of claim 1, wherein the PCIe switch receives source clock signals from the source clock to time data signal distribution at the drive interface board to the NVMe storage devices.

5. The NVMe-based storage system of claim 1, wherein the drive mid-plane baseboard includes a plurality of clock distribution modules coupled to the drive mid-plane baseboard.

6. The NVMe-based storage system of claim 1, further comprising:
additional drive interface boards, PCIe switches, and source clocks to interface with the plurality of NVMe storage devices and a plurality of clock distribution modules.

7. The NVMe-based storage system of claim 1, wherein the clock distribution module relays clock signals from the source clock to a group of NVMe memory devices.

8. A method of assembling an NVMe-based information handling system, comprising:
operatively coupling a processor on a link controller card (LCC) with a data port having network connectivity, the LCC including:
a PCIe switch communicatively coupled to the processor to receive signals from the processor and to transmit those signals to a plurality of NVMe storage devices operatively coupled to a drive mid-plane baseboard;
a source clock communicatively coupled to the PCIe switch; and
a connector communicatively coupled to the PCIe switch to relay signals to the plurality of NVMe storage devices at the drive mid-plane baseboard;
coupling the plurality of NVMe storage devices to the drive mid-plane baseboard, the drive mid-plane baseboard including:
a clock distribution board communicatively coupled to the source clock via the connector; and
a clock distribution module coupled to the clock distribution board to receive a source clock signal from the source clock, the clock distribution module to distribute clocking signals to the plurality of NVMe storage devices.

9. The method of claim 8, further comprising:
forming a cooling system including a plurality of fans placed between the LCC and the drive mid-plane baseboard;
the connector communicatively coupling the source clock to the clock distribution module via a PCB connection board passing the plurality of fans to the connector to the mid-plane baseboard.

10. The method of claim 8, further comprising:
the clock distribution module is operatively coupled to a second clock distribution module on the drive mid-plane baseboard and operates as a dependent clock to the source clock.

11. The method of claim 8, wherein the connector has a reduced number of pins for clocking signals from the source clock to the clock distribution module as compared to the clocking signals provided by the clock distribution module to the plurality of NVMe storage devices.

12. The method of claim 8, wherein the source clock in interfaces with the connector, the connector further comprising:
two dedicated ports for each clock distribution module.

13. The method of claim 8, further comprising:
the LCC with an additional processor, an additional PCIe switch, and additional source clock to interface with a plurality of clock distribution modules.

14. The method of claim 8, further comprising a plurality of clock distribution modules where each clock distribution module relays signals from the source clock to a group of NVMe memory devices.

15. A non-volatile memory express (NVMe) based storage system, comprising:
a storage access module including a processor and an input/output (I/O) port;
a drive interface board including:
a first electronic oscillator communicatively coupled to the processor;
a PCIe switch communicatively coupled to the first electronic oscillator to receive a clock signal from the first electronic oscillator;
a connector communicatively coupled to the electronic oscillator to relay clock signals to a plurality of clock distribution modules at a drive mid-plane baseboard and the connector communicatively coupled to the PCIe switch to relay data signals between the processor and a plurality of NVMe storage devices at the drive mid-plane baseboard;
a cooling system including a plurality of fans placed between the drive interface board and the drive mid-plane baseboard;
a connection board operatively coupling the drive interface board to the connector at the drive mid-plane baseboard;
wherein the drive mid-plane baseboard is communicatively coupled to the electronic oscillator, the drive mid-plane baseboard including:
data and power connection to the plurality of NVMe storage devices; and
each of the plurality of clock distribution modules to relay clock signals to a group of the NVMe storage devices.

16. The NVMe-based storage system of claim 15, wherein the plurality of clock distribution modules operate as dependent clocks to the first electronic oscillator.

17. The NVMe-based storage system of claim 15, wherein one of the clock distribution modules operates as a source clock to the first electronic oscillator.

18. The NVMe-based storage system of claim 15, wherein a connector size is reduced due to a reduced number of clock signal pins.

19. The NVMe-based storage system of claim 15, further comprising an additional processor, an additional PCIe switch, and an additional connector to interface with a plurality of clock signal pins and the plurality of clock distribution modules.

20. The NVMe-based storage system of claim 15, further comprising a plurality of vents in the mid-plane baseboard to provide airflow from the plurality of fans to the plurality of NVMe storage devices where the connector is streamlined to facilitate airflow through the plurality of vents.

* * * * *